Aug. 5, 1930.    O. S. HERSHEY    1,772,043
AUTOMOBILE LOCK
Original Filed June 26, 1926

Inventor:
Orville S. Hershey
by Flemming & Flemming
Attys

Patented Aug. 5, 1930

1,772,043

UNITED STATES PATENT OFFICE

ORVILLE S. HERSHEY, OF CHICAGO, ILLINOIS, ASSIGNOR, BY MESNE ASSIGNMENTS, TO OAKES PRODUCTS CORPORATION, OF NORTH CHICAGO, ILLINOIS, A CORPORATION OF MICHIGAN

AUTOMOBILE LOCK

Original application filed June 26, 1926, Serial No. 118,675. Divided and this application filed May 31, 1928. Serial No. 281,957.

This invention relates to a lock adapted especially for automobiles, and is designed more particularly for association with one of the operating units thereof. It may be connected with a steering mechanism, a change speed mechanism, a motor ignition circuit, or any other unit or system whose operation is required in the use of the vehicle. The improvements herein shown were first disclosed in my application which issued on October 16, 1928, into Letters Patent No. 1,687,836, of which this case is a division.

The embodiment of my invention herein described includes a switch which may be interposed in the motor ignition circuit. Such a switch is designed to be opened, thereby rendering the motor inoperative, whenever the lock is operated to interfere with use of an associated mechanism. The present invention is directed more especially toward certain means for controlling the operation of the lock, means by which it is operatively connected with the switch, and means by which the switch construction is simplified and improved. It is a primary object of this invention to produce a readily manipulatable lock mechanism which cannot, however, be accidentally operated while the motor is running, with possible disastrous consequences to occupants of the vehicle. My invention is accordingly concerned with a combined lock and switch having the characteristics noted, and also with other objects and purposes which will hereinafter appear.

Figure 1:
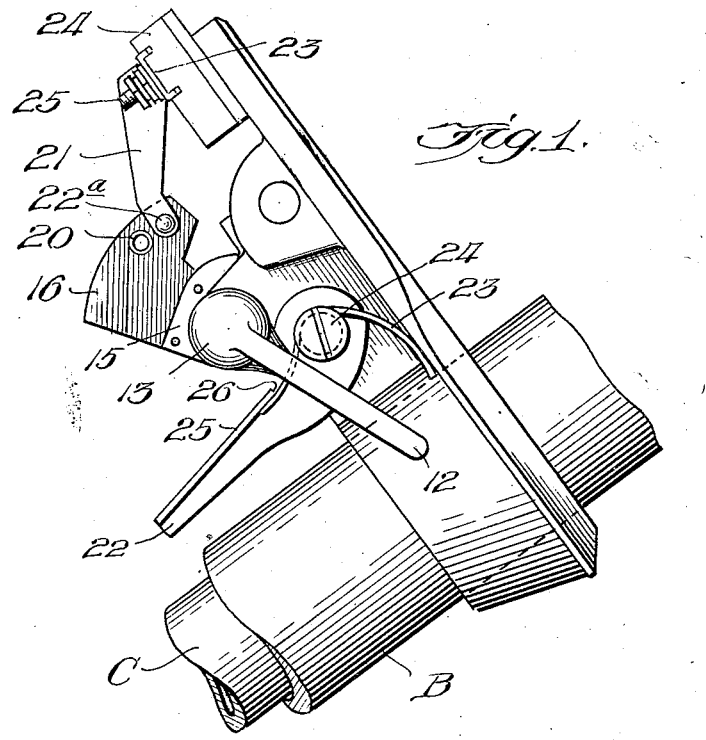
Figure 1 shows a side elevation of the lock housing with associated switch, in operative relation to an automobile steering column.

The present lock may be contained within a housing A through which is an opening for accommodating the column B within which is extended a post C connecting a steering wheel with the swiveled running wheels, usually at the front of an automobile. Secured fast to the post is a collar D having therein a groove or socket 4 which may be brought into register with an opening 5 formed in the column. The locking mechanism herein shown includes a bolt 6 adapted to be projected through the opening 5 into the socket so as to lock the steering post against rotation. This bolt is associated yieldingly with a hollow plunger 7 wherein is accommodated a coiled spring 8 which tends to project the bolt into locking position. The forward movement of this bolt, relative to the plunger, may be arrested by a stop 9. A second spring 10 exerts an opposite force on the plunger such as to retract the same, whenever conditions will permit, against a stop 11.

Associated with the plunger is a control means for the locking bolt. As shown, this comprises an operating lever or handle 12 which is extended laterally from a hub 13 which is secured to one end of a rock shaft 14. This shaft has a rotatable mounting on the under side of the lock housing, and carries fast two plates 15 between which is a disk 16. The disk and associated plates extend into a slot 17 which is formed longitudinally in the plunger 7. Mounted crosswise of this slot is a roller pin 18 which is disposed within an opening 19 in the disk unit so as to receive motion therefrom when the shaft 14 is turned in response to movements of the operating handle. For reasons which will presently appear, I provide an appreciable clearance in the opening 19 around the pin 18 so that movements of the shaft 14 will precede by a definite distance any change in position of the plunger 7.

The disk 16 extends radially beyond its supporting plates so that a portion of its surface is exposed. An eyelet 20 is carried by the disk, and associated with this eyelet is a pair of spring brushes 21 formed near their extremities with inwardly facing buttons 22ª adapted to seat within opposite ends of the eyelet. The two brushes each proceed from a laterally extended base 23 which is mounted upon an insulating block 24 supported on the under side of the lock housing. As by means of binding posts 25 electrical connections to the brushes may readily be established. These brushes, together with the eyelet which is movable between them to complete an electrical circuit, constitute a simple form of switch which is well adapted for the purpose of this invention. Since the disk which carries the eyelet is moved in response to actuation of the shaft 14 which also controls the lock mechanism, means are provided for conjointly operating the lock and switch.

It will be noted that the clearance around the roller pin 18 is such that the rock shaft may be rotated slightly in either direction without transmitting motion to the plunger 7. This enables the operator to move the eyelet 20 away from the brushes 21 in either direction, without actuating the lock mechanism. This movement is arrested when the slack has been taken up by the loose movement permitted to the disk 16. This free movement of the disk is sufficient to break the electrical circuit, thereby cutting off operation of the motor. The steering mechanism with which the lock may be associated is in nowise disabled by this one-stage operation.

Figure 2:
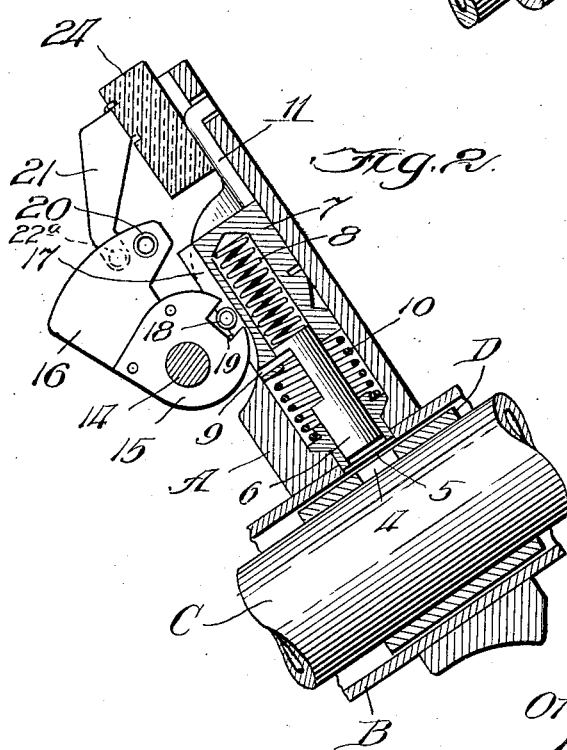
Fig. 2 is a longitudinal section through the lock structure taken through a plane which coincides with the axes of the locking bolt and steering shaft.
Figure 3:
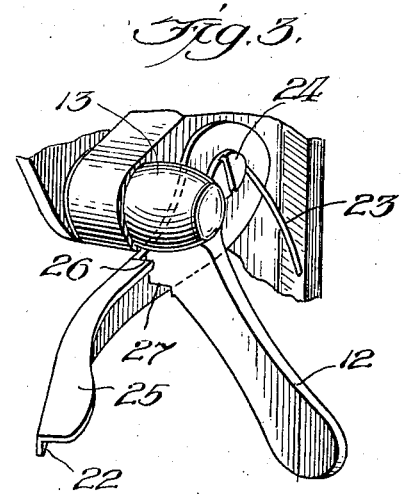
Fig. 3 is a perspective fragmentary view of the lock control and associated detent.

The advance of the locking bolt 6 is brought about by a movement of the shaft 14 in a direction reverse to that required for moving the switch to the position of Fig. 1. The relationship of the switch parts indicated in Fig. 2 is that which obtains when the switch is opened preliminary to advancement of the locking bolt. It will be observed in this figure that the switch is also open due to the fact that the eyelet 20 has moved from between the two brushes 21. I would have it noted, however, that the switch movement precedes that of the locking bolt when the latter is moved to an advanced position, and on the return stroke the locking bolt is restored to its initial position before the switch is closed. The advantage of this two-stage operation is that the motor is first cut off before the steering is disabled, and, conversely, the steering is again made operative before operation of the motor can be resumed.

In the structure herein shown I associate with the operating handle 12 a second lever 22 constituting a detent therefor. A spring 23 which is coiled around a pivot pin 24 for this detent lever bears with one end against the lock housing and with its other end against a flange 25 which extends laterally from one edge of the lever. The flange is cut off as at 26 adjacent a shoulder 27 which depends from the hub of the operating handle. With the detent lever in the normal position to which it is urged by the spring 23, the flange end 26 is disposed in the movement path of the shoulder 27 whereby to prevent any but a limited movement of the handle in the direction necessary to advance the locking bolt. The limited handle movement just mentioned is sufficient to remove the eyelet 20 from between the brushes 21 whereby to break the electrical circuit through the switch. This movement may not continue further unless the detent lever be first swung down against the tension of the spring 23. When depressed sufficiently, the handle may be moved through the necessary distance to effect an advance of the locking bolt.

In the use herein of the terms "open" and "closed" with reference to the motor ignition circuit, I have in mind the system of ignition most generally employed, but knowing that magneto equipped motors may be operated on an open circuit, which is the reverse of the prevailing kind, I would have these terms properly interpreted to describe the true situation. The various details of construction hereinbefore set forth are manifestly susceptible of embodiment in forms other than the precise ones shown, and any such modifications, in so far as they fall within the purview of the claims below, are to be considered as within the limits of my invention.

I claim:

1. In a lock, the combination with an operating member, of a bolt movable into engagement with said member to oppose operation thereof, an operating shaft for the bolt, a handle affixed to the shaft, and a spring actuated lever adapted normally to interfere with movements of the handle, the lever being movable out of the handle path whereby to permit free operation thereof, substantially as described.

2. In a lock, the combination with an operating member, of a bolt movable into engagement with said member to oppose operation thereof, an operating shaft for the bolt, a switch to which the shaft is also connected operatively, and means whereby the shaft may be turned from an initial position in either direction, in one to operate the switch alone and in the other to operate both the switch and bolt, substantially as described.

3. In a lock, the combination with an operating member, of a bolt movable into engagement with said member to oppose operation thereof, an operating shaft for the bolt, a handle affixed to the shaft, a lever having a pivotal mounting parallel with the shaft, a spring tending normally to project the lever into the path of the handle whereby movement thereof from initial position is prevented, the lever when depressed being removed from interfering position whereby the handle may be freely moved, substantially as described.

In testimony whereof, I have hereunto set my hand this 25th day of May, 1928.

ORVILLE S. HERSHEY.